US008122335B2

(12) United States Patent  
Duhig et al.

(10) Patent No.: US 8,122,335 B2  
(45) Date of Patent: Feb. 21, 2012

(54) METHOD OF ORDERING AND PRESENTING IMAGES WITH SMOOTH METADATA TRANSITIONS

(75) Inventors: Jonathan Anthony Duhig, Scotland Island (AU); Myriam Elisa Lucie Amielh, Frenchs Forest (AU)

(73) Assignee: Canon Kabushiki Kaisha, Tokyo (JP)

( * ) Notice: Subject to any disclaimer, the term of this patent is extended or adjusted under 35 U.S.C. 154(b) by 1065 days.

(21) Appl. No.: 11/949,220

(22) Filed: Dec. 3, 2007

(65) Prior Publication Data

US 2008/0313214 A1      Dec. 18, 2008

(30) Foreign Application Priority Data

Dec. 7, 2006  (AU) ................................ 2006249239

(51) Int. Cl.  
*G06F 17/00* (2006.01)
(52) U.S. Cl. ...................................................... 715/200
(58) Field of Classification Search .................. 715/200, 715/255, 230  
See application file for complete search history.

(56) References Cited

U.S. PATENT DOCUMENTS

| 5,343,556 | A  | * | 8/1994 | Silverberg ................... 358/1.12 |
| 6,269,366 | B1 | * | 7/2001 | Romano et al. ..................... 1/1 |
| 6,408,301 | B1 | * | 6/2002 | Patton et al. ................. 707/741 |
| 6,606,409 | B2 | * | 8/2003 | Warnick et al. .............. 382/173 |
| 6,636,220 | B1 |   | 10/2003 | Szeliski et al. ................ 345/475 |
| 7,295,990 | B1 | * | 11/2007 | Braumoeller et al. ....... 705/7.31 |
| 7,631,015 | B2 | * | 12/2009 | Gupta et al. ........................ 1/1 |
| 7,640,343 | B2 | * | 12/2009 | Scott, III ........................ 709/226 |
| 2001/0041020 | A1 | * | 11/2001 | Shaffer et al. ................. 382/305 |
| 2001/0046330 | A1 | * | 11/2001 | Shaffer et al. ................. 382/284 |
| 2002/0054059 | A1 |   | 5/2002 | Schneiderman .............. 715/700 |
| 2003/0009493 | A1 | * | 1/2003 | Parker et al. ................ 707/500.1 |
| 2003/0202243 | A1 | * | 10/2003 | Boys et al. .................... 359/410 |
| 2005/0081147 | A1 | * | 4/2005 | Tanaka et al. ................. 715/517 |
| 2005/0273704 | A1 | * | 12/2005 | Dunietz et al. ............... 715/513 |
| 2006/0036466 | A1 | * | 2/2006 | Tarr et al. .......................... 705/1 |
| 2006/0092291 | A1 | * | 5/2006 | Bodie ....................... 348/231.99 |

(Continued)

FOREIGN PATENT DOCUMENTS

GB          2338324          12/1999

OTHER PUBLICATIONS

Zhang et al., Support Vector Machine Learning for Image Retrieval, IEEE 2001, pp. 721-724.*

(Continued)

*Primary Examiner* — Cong-Lac Huynh  
(74) *Attorney, Agent, or Firm* — Fitzpatrick, Cella, Harper & Scinto

(57) ABSTRACT

A method (100) of generating an ordered sequence of items from a collection of items, at least one of the items of the collection having at least two annotations, is disclosed. The method (100) selects one or more of the annotations and forms a first plurality of groups of items from the collection of items, each item in a group having one or more of the selected annotations in common. The method (100) selects a second plurality of the groups of items to form a sequence of groups, each group in the sequence comprising an item having at least one annotation in common with an item of at least one adjacent group of the sequence. The items are ordered within each of the selected groups of the sequence based on the selected annotations.

12 Claims, 15 Drawing Sheets

U.S. PATENT DOCUMENTS

| | | | |
|---|---|---|---|
| 2006/0265640 A1* | 11/2006 | Albornoz et al. | 715/512 |
| 2007/0115373 A1* | 5/2007 | Gallagher et al. | 348/231.3 |
| 2007/0136286 A1 | 6/2007 | Webster et al. | 707/7 |
| 2007/0150802 A1* | 6/2007 | Wan et al. | 715/512 |
| 2007/0250532 A1* | 10/2007 | Beato et al. | 707/103 R |
| 2008/0077569 A1* | 3/2008 | Lee et al. | 707/5 |
| 2008/0136838 A1* | 6/2008 | Goede et al. | 345/619 |
| 2008/0150892 A1 | 6/2008 | Duhig et al. | 345/156 |
| 2008/0154931 A1* | 6/2008 | Jacobs et al. | 707/101 |
| 2008/0155473 A1 | 6/2008 | Duhig | 715/818 |
| 2008/0155474 A1 | 6/2008 | Duhig | 715/830 |
| 2008/0155475 A1 | 6/2008 | Duhig | 715/830 |
| 2011/0077169 A1* | 3/2011 | McKernan et al. | 506/16 |
| 2011/0099478 A1* | 4/2011 | Gallagher et al. | 715/735 |

OTHER PUBLICATIONS

Manmatha et al., Modeling Score Distributions for Combining the Outputs of Search Engines, ACM 2001, pp. 267-278.*

Kim et al., Qcluster: Relevance Feedback Using Adaptive Clustering for Content-Based Image Retrieval, ACM 2003, pp. 599-610.*

Karasuda et al., Textual Annotation in a Head Tracked, Stereosopic Virtual Design Environment, Google 2004, pp. 1-10.*

Lee et al., Modeling Annotators to Improve Semantic Annotation and Retrieval Images, IEEE 2005, pp. 1-4.*

* cited by examiner

METHOD OF ORDERING AND PRESENTING IMAGES WITH SMOOTH METADATA TRANSITIONS

CROSS-REFERENCE TO RELATED PATENT APPLICATIONS

This application claims the right of priority under 35 U.S.C. §119 based on Australian Patent Application No. 2006249239, filed 7 Dec. 2006, which is incorporated by reference herein in its entirety as if fully set forth herein.

FIELD OF THE INVENTION

The current invention relates to the generation of audiovisual presentations based on related descriptive metadata and, in particular, to a method and apparatus for generating an ordered sequence of items (e.g., images, text, audio files, video documents, computer automated drawing (CAD) designs of buildings and medical images) from a collection of items. The invention also relates to a computer program product including a computer readable medium having recorded thereon a computer program for generating an ordered sequence of items from a collection of items

BACKGROUND

With the advent and huge popularity of image scanners, video capture cards and digital still and video cameras it is common for people to store a large number of photographs, and other documents on personal computers and other computer related devices. There is a need for users of these devices to be able to access, organize and navigate through their documents.

Over the last decade, many industries and academies have concentrated their efforts on developing technologies for facilitating automatic or semi-automatic annotation of multimedia content. As a result, a number of prototypes have been developed for demonstrating technologies such as automatic labelling using image processing, time or content-based automatic clustering and metadata propagation. User Interface experts have also largely explored the problem of annotating content efficiently, for instance through drag-and-drop strategies or through the use of dynamic recommendation.

Metadata thereby opens a new perspective for navigating audiovisual content. In particular, descriptive metadata makes it possible to explore a collection of images through their semantic relationships, rather than solely using the chronological approach.

The term "annotation" as used herein refers to voice recordings, keywords, comments, notes or any type of descriptive metadata that can be attached to a document by a user. An annotation may comprise one or more category-value pairs, for instance category="Location", value="India". These category-value pairs may be user-defined category-value pairs. When a new category-value pair is assigned to a document, the category-value pair is simply added to a list of category-value pairs (also referred to as "annotations") for the document.

Metadata-based navigation is known in the form of narrative systems for browsing collections of keyword-annotated content. For example, the "automatist storyteller" systems rely on the concept of activation-values assigned both to keywords and content. When a keyword or a piece of content is clicked on, an activation value associated with the keyword or piece of content is raised, while the activation value of other content is decreased. Activation values thereby provide a relative value system, which serves as the basis for both an automatic content selection algorithm and graphical display.

Various graphical user interfaces (GUIs) are also known for providing a large-scale picture of a collection of audiovisual items that allow a user to navigate through metadata relationships between items.

Automatic methods for constructing audio "playlists" of similar songs limiting abrupt transitions have also been developed. Such methods use a music similarity graph expressed as links between various artists, albums, and songs in order to automatically construct a set of coordinate vectors for use in inferring similarity between various pieces of music.

A need exists for an improved method of generating an ordered sequence of items from a collection of items.

SUMMARY

According to one aspect of the present invention there is provided a method of generating an ordered sequence of items from a collection of items, at least one of said items of said collection having at least two annotations, the method comprising the steps of:

selecting one or more of said annotations;

forming a first plurality of groups of items from said collection of items, each item in a group having one or more of said selected annotations in common;

selecting a second plurality of said groups of items to form a sequence of groups, each group in said sequence comprising an item having at least one annotation in common with an item of at least one adjacent group of said sequence; and ordering the items within each of said selected groups of said sequence based on said selected annotations.

According to another aspect of the present invention there is provided an apparatus for generating an ordered sequence of items from a collection of items, at least one of said items of said collection having at least two annotations, the apparatus comprising:

first selection mean for selecting one or more of said annotations;

forming means for forming a first plurality of groups of items from said collection of items, each item in a group having one or more of said selected annotations in common;

second selection means for selecting a second plurality of said groups of items to form a sequence of groups, each group in said sequence comprising an item having at least one annotation in common with an item of at least one adjacent group of said sequence; and ordering means for ordering the items within each of said selected groups of said sequence based on said selected annotations.

According to still another aspect of the present invention there is provided a computer readable medium, having a program recorded thereon, where the program is configured to make a computer execute a procedure to generate an ordered sequence of items from a collection of items, at least one of said items of said collection having at least two annotations, the program comprising:

code for selecting one or more of said annotations;

code for forming a first plurality of groups of items from said collection of items, each item in a group having one or more of said selected annotations in common;

code for selecting a second plurality of said groups of items to form a sequence of groups, each group in said sequence comprising an item having at least one annotation in common with an item of at least one adjacent group of said sequence; and code for ordering the items within each of said selected groups of said sequence based on said selected annotations.

Other aspects of the invention are also disclosed.

BRIEF DESCRIPTION OF THE DRAWINGS

Some aspects of the prior art and one or more embodiments of the present invention will now be described with reference to the drawings and appendices, in which.

DETAILED DESCRIPTION INCLUDING BEST MODE

Figure 1:
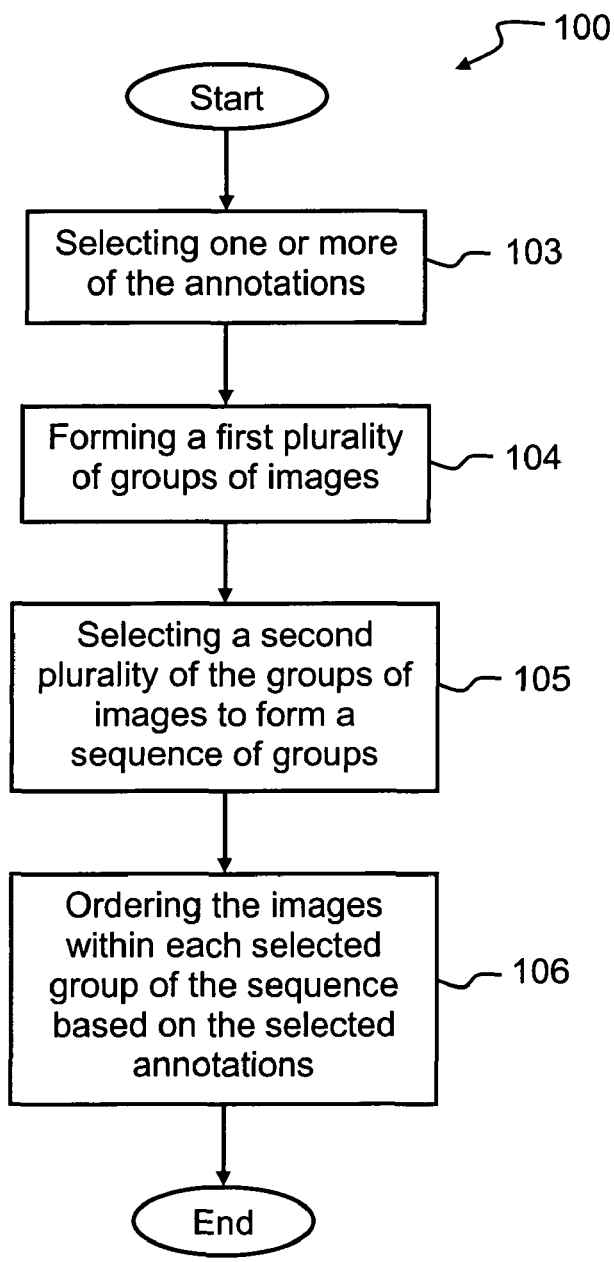
FIG. 1 is a flow diagram showing a method of ordering annotated images.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Methods of generating an ordered sequence of items from a collection of items are described below. In the described methods, annotations are used to describe items in the form of digital still images. However, the described methods may be used with other types of items such as text, audio files, video documents, computer automated drawing (CAD) designs of buildings and medical images (e.g., molecules or models of DNA sequences), for example.

As described above, the term "annotation" refers to voice recordings, keywords, comments, notes or any type of descriptive metadata that can be attached to a document by a user. Further, an annotation may comprise one or more category-value pairs, as described above. These category-value pairs may be user-defined category-value pairs.

The methods described below navigate annotated images based on metadata resemblance. The methods order annotated items based on how descriptive annotations associated with the items are of the associated images, thereby allowing smoother semantic transitions. The methods allow sequences of items to be extracted and presented in a graphical user interface (GUI) together with their metadata.

Figure 9A:
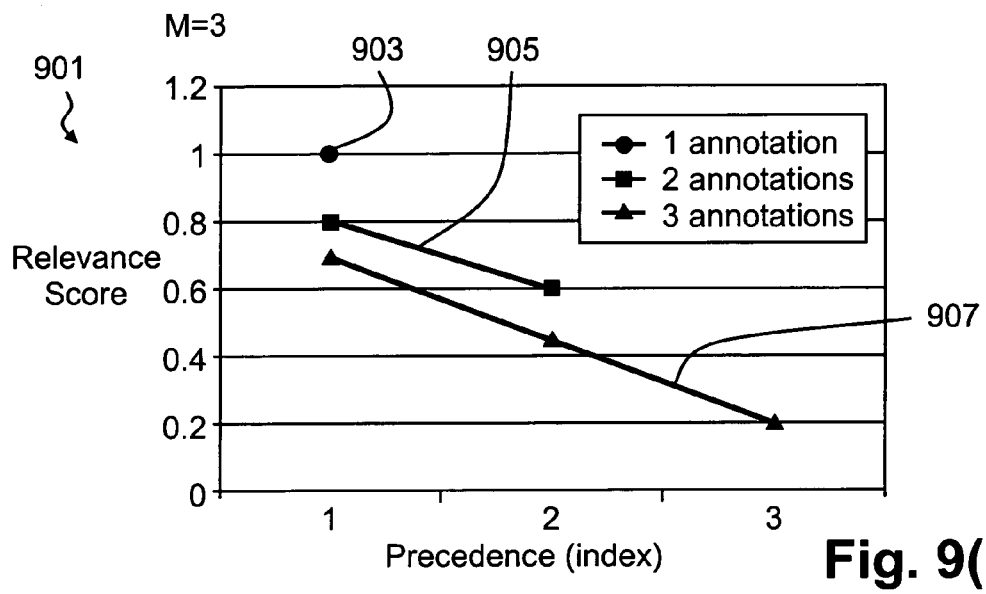
FIG. 9(a) is a graph of relevance score values experimentally generated for three annotations based on the relevance score model of FIG. 8.
Figure 9B:
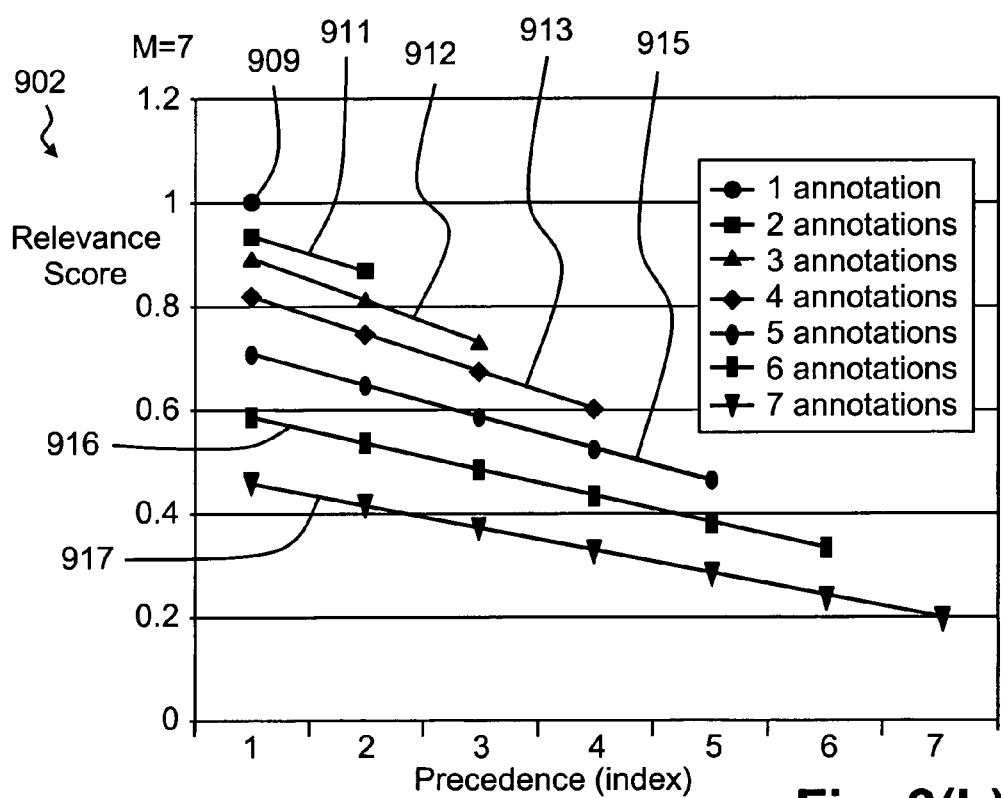
FIG. 9(b) is a graph of other relevance score values experimentally generated for seven annotations based on the relevance score model of FIG. 8.
Figure 10:
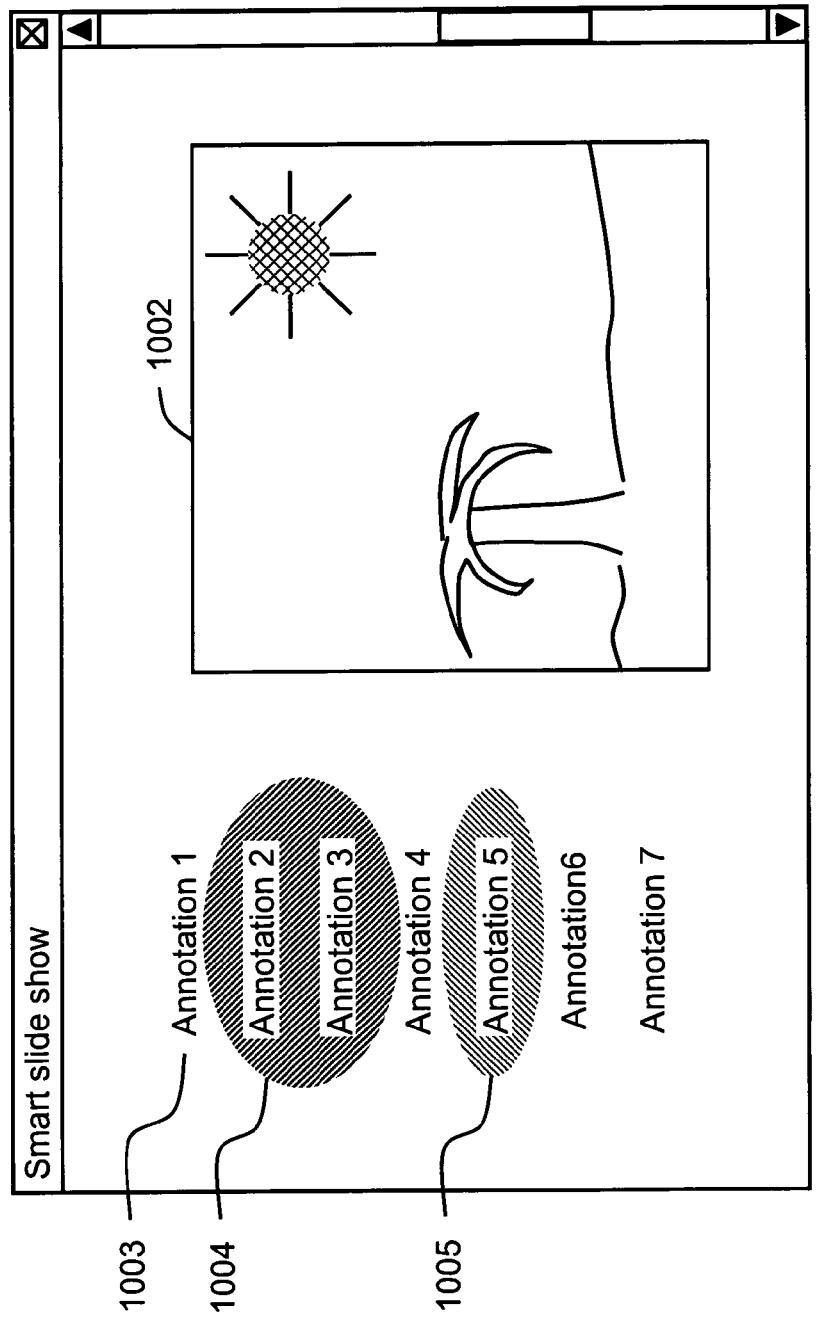
FIG. 10 is an example of a graphical user interface that may be used in one embodiment.
Figure 11:
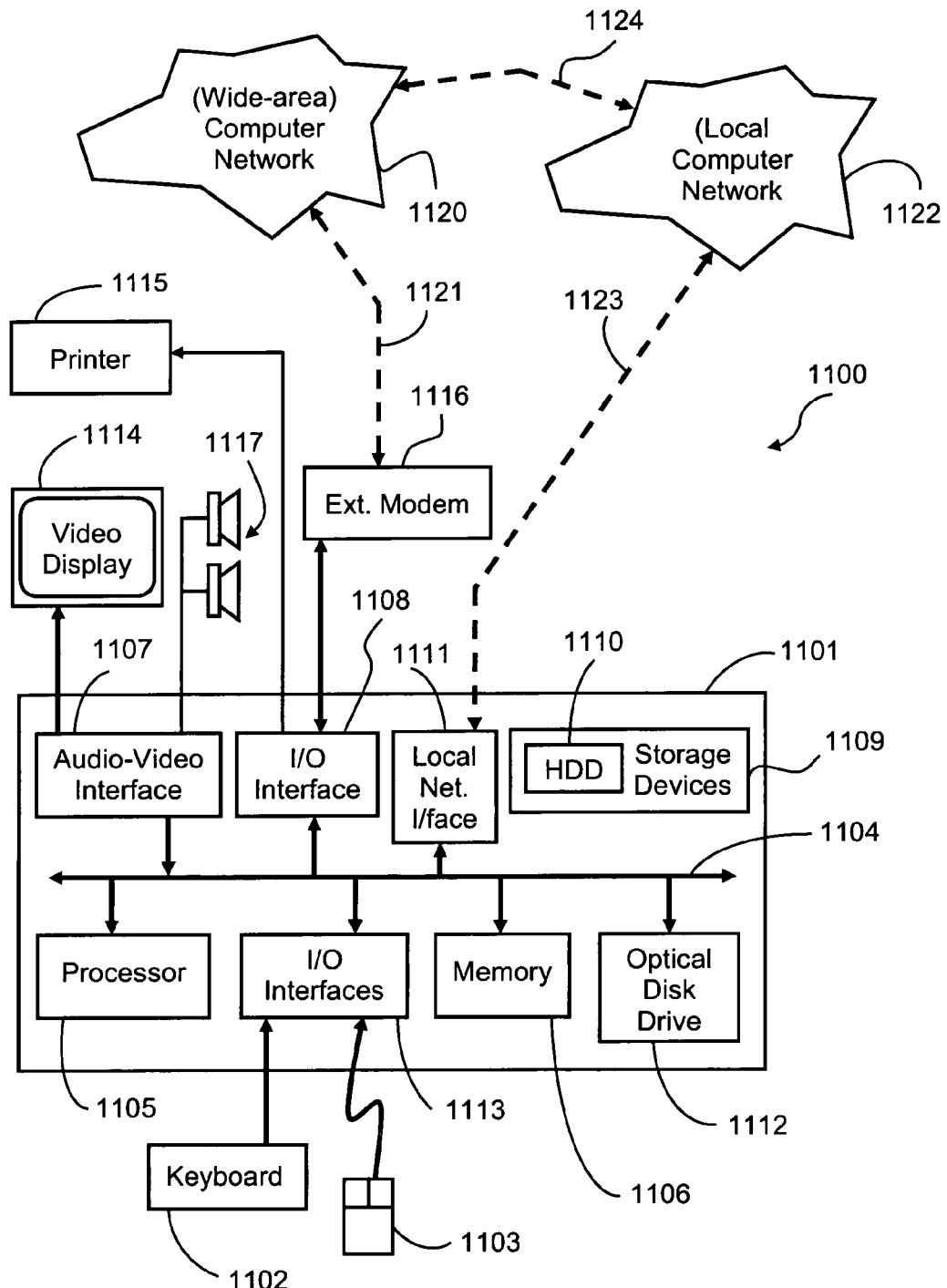
FIG. 11 is a schematic block diagram of a general purpose computer upon which arrangements described can be practiced.

The described methods may be implemented using a computer system 1100, such as that shown in FIG. 11 wherein the processes of FIGS. 1 to 10, 13 and 14 may be implemented as software, such as one or more application programs executable within the computer system 1100. In particular, the steps of the described methods may be effected by instructions in the software that are carried out within the computer system 1100. The instructions may be formed as one or more code modules, each for performing one or more particular tasks. The software may also be divided into two separate parts, in which a first part and the corresponding code modules performs the described methods and a second part and the corresponding code modules manage a graphical user interface (GUI) 1000 as seen in FIG. 10, for example, between the first part and the user. The GUI 1000 will be described in detail below with reference to FIG. 10.

The software may be stored in a computer readable medium, including the storage devices described below, for example. The software is loaded into the computer system 1100 from the computer readable medium, and then executed by the computer system 1100. A computer readable medium having such software or computer program recorded on it is a computer program product. The use of the computer program product in the computer system 1100 preferably effects an advantageous apparatus for implementing the described methods.

As seen in FIG. 11, the computer system 1100 is formed by a computer module 1101, input devices such as a keyboard 1102 and a mouse pointer device 1103, and output devices including a printer 1115, a display device 1114 and loudspeakers 1117. An external Modulator-Demodulator (Modem) transceiver device 1116 may be used by the computer module 1101 for communicating to and from a communications network 1120 via a connection 1121. The network 1120 may be a wide-area network (WAN), such as the Internet or a private WAN. Where the connection 1121 is a telephone line, the modem 1116 may be a traditional "dial-up" modem. Alternatively, where the connection 1121 is a high capacity (e.g.: cable) connection, the modem 1116 may be a broadband modem. A wireless modem may also be used for wireless connection to the network 1120.

The computer module 1101 typically includes at least one processor unit 1105, and a memory unit 1106 for example formed from semiconductor random access memory (RAM) and read only memory (ROM). The module 1101 also includes an number of input/output (I/O) interfaces including an audio-video interface 1107 that couples to the video display 1114 and loudspeakers 1117, an I/O interface 1113 for the keyboard 1102 and mouse 1103 and optionally a joystick (not illustrated), and an interface 1108 for the external modem 1116 and printer 1115. In some implementations, the modem 1116 may be incorporated within the computer module 1101, for example within the interface 1108. The computer module 1101 also has a local network interface 1111 which, via a connection 1123, permits coupling of the computer system 1100 to a local computer network 1122, known as a Local Area Network (LAN). As also illustrated, the local network 1122 may also couple to the wide network 1120 via a connection 1124, which would typically include a so-called "firewall" device or similar functionality. The interface 1111 may be formed by an Ethernet™ circuit card, a wireless Bluetooth™ or an IEEE 802.11 wireless arrangement.

The interfaces 1108 and 1113 may afford both serial and parallel connectivity, the former typically being implemented according to the Universal Serial Bus (USB) standards and having corresponding USB connectors (not illustrated). Storage devices 1109 are provided and typically include a hard disk drive (HDD) 1110. Other devices such as a floppy disk drive and a magnetic tape drive (not illustrated) may also be used. An optical disk drive 1112 is typically provided to act as a non-volatile source of data. Portable memory devices, such as optical disks (e.g.: CD-ROM, DVD), USB-RAM, and floppy disks for example may then be used as appropriate sources of data to the system 1100.

The components 1105 to 1113 of the computer module 1101 typically communicate via an interconnected bus 1104 and in a manner which results in a conventional mode of operation of the computer system 1100 known to those in the relevant art. Examples of computers on which the described arrangements can be practiced include IBM-PC's and compatibles, Sun Sparcstations, Apple Mac™ or alike computer systems evolved therefrom.

Typically, the application programs discussed above are resident on the hard disk drive 1110 and read and controlled in execution by the processor 1105. Intermediate storage of such programs and any data fetched from the networks 1120 and 1122 may be accomplished using the semiconductor memory 1106, possibly in concert with the hard disk drive 1110. In some instances, the application programs may be supplied to the user encoded on one or more CD-ROM and read via the corresponding drive 1112, or alternatively may be read by the user from the networks 1120 or 1122. Still further, the software can also be loaded into the computer system 1100 from other computer readable media. Computer readable media refers to any storage medium that participates in providing instructions and/or data to the computer system 1100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1101. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 1114. Through manipulation of the keyboard 1102 and the mouse 1103, a user of the computer system 1100 and the application may manipulate the interface to provide controlling commands and/or input to the applications associated with the GUI(s).

The described methods may alternatively be implemented in dedicated hardware such as one or more integrated circuits performing the functions or sub functions of the methods. Such dedicated hardware may include graphic processors, digital signal processors, or one or more microprocessors and associated memories.

As previously described, an annotation typically consists of a category-value pair, where the category can be any of {people, location, event, action, item, keyword, etc}. The value may be provided by a user. A particular image (or other type of item) may receive multiple annotations in relation to one or more categories.

A method 100 of generating an ordered sequence of digital images (or items) from a collection of digital images will now be described with reference to FIG. 1. The method 100 may be implemented as software resident on the hard disk drive 1110 and being controlled in its execution by the processor 1105. The digital images have associated annotations with at least one of the digital images having at least two annotations associated therewith. The collection of digital images and annotations may be stored, for example, within a database configured within memory 1110.

The method 100 begins at a first step 103, where the processor 1105 performs the step of selecting one or more (i.e., a sub-set) of the annotations. The annotations selected at step 103 may be stored in a list of annotations configured within the database stored in the memory 1106, for example. In step 103, a number of annotations that potentially present a particular interest to a user may be selected. Any suitable method may be used to select these annotations. Step 103 will be described in more detail below.

Then, at the next step 104, the processor 1105 performs the step of forming a first plurality of groups of images from the collection of images. Each image in a particular one of the groups has one or more of the selected annotations in common. In the method 100, an image of the collection is assigned to a particular one of the first plurality of groups as soon as any of the annotations associated with the image match one of the annotations of the particular group. As a result, within each group all images have one or more of the annotations selected in step 103, in common. Alternatively, an image of the collection of the images may be assigned to one of the first plurality of groups as soon as any annotations associated with the image "are similar to" annotations associated with the particular one group. Step 104 will be described in more detail below.

At the next step 105, the processor 1105 performs the step of selecting a second plurality of the groups of images formed at step 104 to form a sequence of groups. Each group in the sequence comprises an image which has at least one annotation in common with an image of at least one of the adjacent group of the sequence. As will be described in detail below, the selection of the second plurality of groups to form the sequence of groups is preferably based on the construction of a directed graph of semantic transitions. In this instance, the selection of the second plurality of groups is based on selection of a path in such a directed graph.

Then, in step 106, the processor 1105 performs the step of ordering the images within each of the selected groups of the sequence based on the selected annotations. An ordered list of images is determined for each selected group of the sequence. The processor 1105 concatenates the ordered lists of images from each selected group to generate a sequence of images in a further ordered list.

As described above, in step 103 the processor 1105 performs the step of selecting one or more (i.e., a sub-set) of the annotations. A number of annotations that potentially present a particular interest may be selected, using various selection methods, at step 103. For example, the annotations may be selected based on a "frequency score" assigned to each of the annotations. The frequency score assigned to a particular annotation is a measure of how often the particular annotation occurs in the database in which the images and annotations are stored. As an example, annotations having a frequency score that is higher than a predetermined threshold (e.g., three (3)) may be selected at step 103.

Alternatively, a predetermined number N of annotations having highest frequency scores may be selected at step 103. The value of N may be set arbitrarily and/or may be proportional to the size of the database in which the images and annotations are stored. The selection of annotations at step 103 may also be based on certain category-specific conditions. For example, the selected annotations may be required to match one or more predetermined category-specific conditions. Such category-specific conditions can for instance be derived from a "user profile" (i.e. a record of specific user preferences). Another example of a category-specific condition is requiring the annotations not to match such specific categories. The annotations may also be selected at step 103 based on a priority value assigned to each annotation category. Such priority values may also be inferred from a user profile.

The annotations may also be selected at step 103 based on a measure of how much the annotations are descriptive of the images that the annotations describe. As described below, a "relevance score model" may be used for determining how much the annotations are descriptive of the images that the annotations describe. That is, the relevance score model quantifies how descriptive an annotation is with respect to a corresponding image. The selected annotations may be selected using a relevance score associated with each of the annotations.

Alternatively, the relevance score can be relative to the annotation order of input on the basis that users tend to first provide a more descriptive piece of information when annotating. In this instance, a number, K, of most frequent annotations that were the first one to be user-added for an image, may be selected at step 103. Still further, the relevance score may be based upon the number of annotations a corresponding image has associated therewith.

In one embodiment, the selection of annotations at step 103 relies on a combination of user preferences and frequency analysis of the annotations stored in the database.

Figure 2:
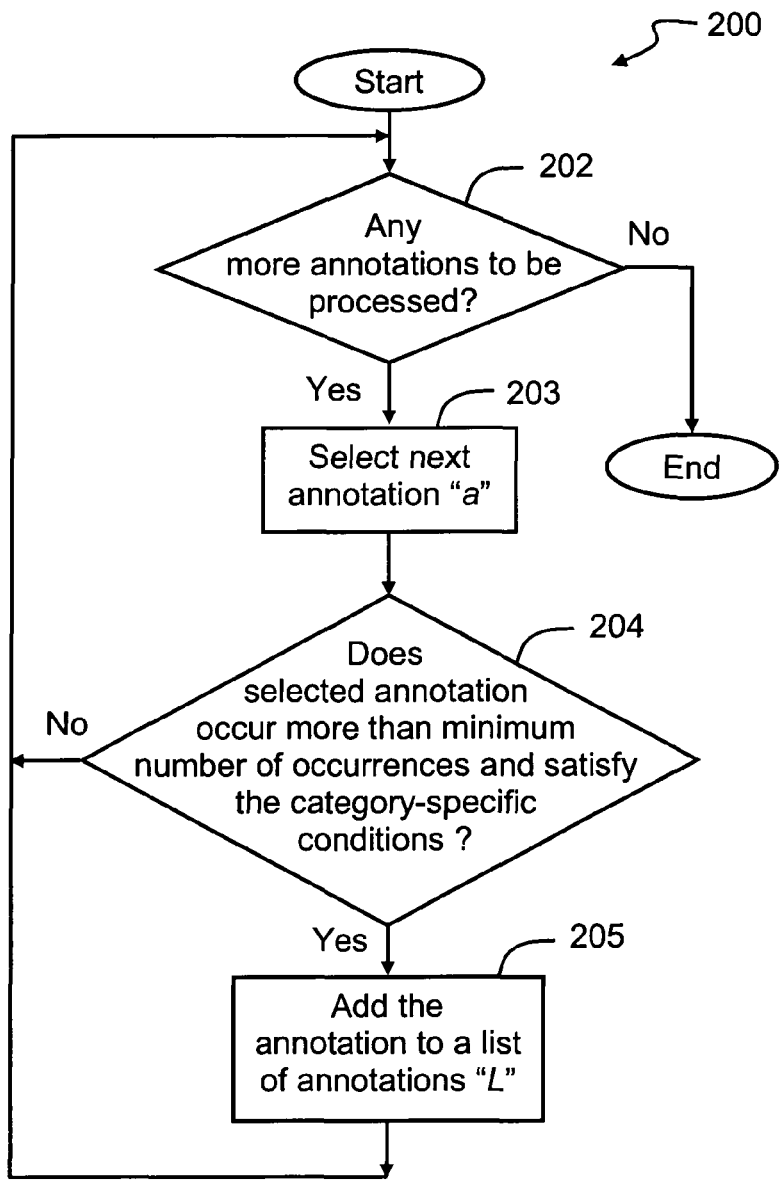
FIG. 2 is a flow diagram showing a method of selecting annotations, as executed in the method of FIG. 1.

A method 200 of selecting annotations, as executed at step 103, will now be described with reference to FIG. 2. The method 200 may be implemented as software resident on the hard disk drive 1110 and being controlled its execution by the processor 1105.

The method 200 receives input data including a list of category-specific conditions $\{C_i, i\}$ and a minimum number of occurrences N. The number of occurrences of the annotation in the database may be expressed as a variable, occurrence_score. The category specific conditions may be, for example, "only annotations in category People", "no annotation relative to category Event" or "only annotations relative to categories People or Place".

The method 200 begins at step 202, where if the processor 1105 determines that there are more annotations in the database to be processed, then the method 200 proceeds to step 203. Otherwise, the method 200 concludes.

At the next step 203, the processor 1105 selects a next annotation, "a", in the database for processing. Then at the next step 204, if the processor 1105 determines that the annotation selected at step 203 occurs in the database more than the minimum number of occurrences N (i.e., occurrence_score (a)>N) and the selected annotation satisfies the list of category-specific conditions (i.e., $\{C_i, i\}$), then the method 200 proceeds to step 205. Otherwise, the method 200 returns to step 202.

At step 205, the annotation, a, selected at step 203 is added to a list of annotations, L, which may be configured within memory 1106, for example. Accordingly, the method 200 selects each annotation a in the database that verifies the category-specific conditions and which occurs in the database more than N times, where for example N is equal to two (2).

As described above, at step 104, the processor 1105 performs the step of forming a first plurality of groups of images from the collection of images. The images are assigned to one or more groups within each of which all images have one or more of the annotations selected at step 103 in common. Each group is generated based on one or more of the selected annotations. In this description, the term "group's annotations" refers to annotations that define a particular group.

In the method 100, an image of the collection of images stored in the database is assigned to a particular group as soon as any of the annotations associated with the image matches one of the annotations of the group. As a result, within each group, all images have one or more of the annotations selected at step 103 in common. Further, some images may be assigned to more than one group.

Other grouping methods may be used at step 104. For example, in one embodiment, each image may be assigned to one and only group based on the degree to which the annotations of a particular image match the annotations of the group. That is each of the images may belong to only one of the first plurality of groups. Alternatively, each image may be assigned to a group in a manner which results in an even distribution of the images across groups.

As described above, at step 105 the processor 1105 performs the step of selecting a second plurality of the groups of images formed at step 104 to form a sequence of groups. The sequence of groups is formed such that each group in the sequence contains an image which has at least one annotation in common with an image of one of the adjacent groups in the sequence. The selection of the second plurality of groups at step 105 to form the sequence of groups is preferably based on the construction of the directed "graph of semantic transitions". This graph may also be referred to as a "semantic transitions graph."

Figure 3:
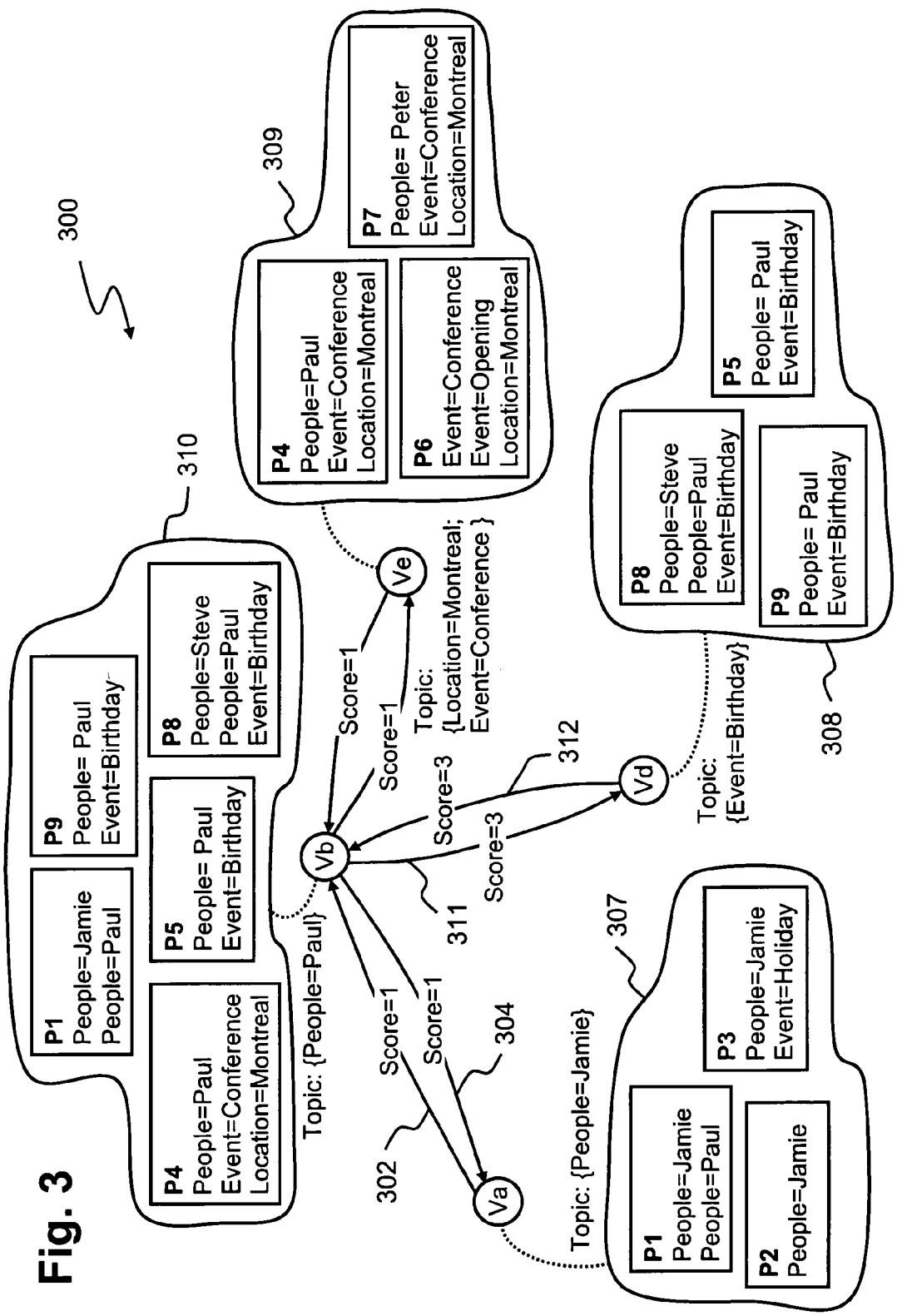
FIG. 3 shows an example of a semantic transitions graph.
Figure 4:
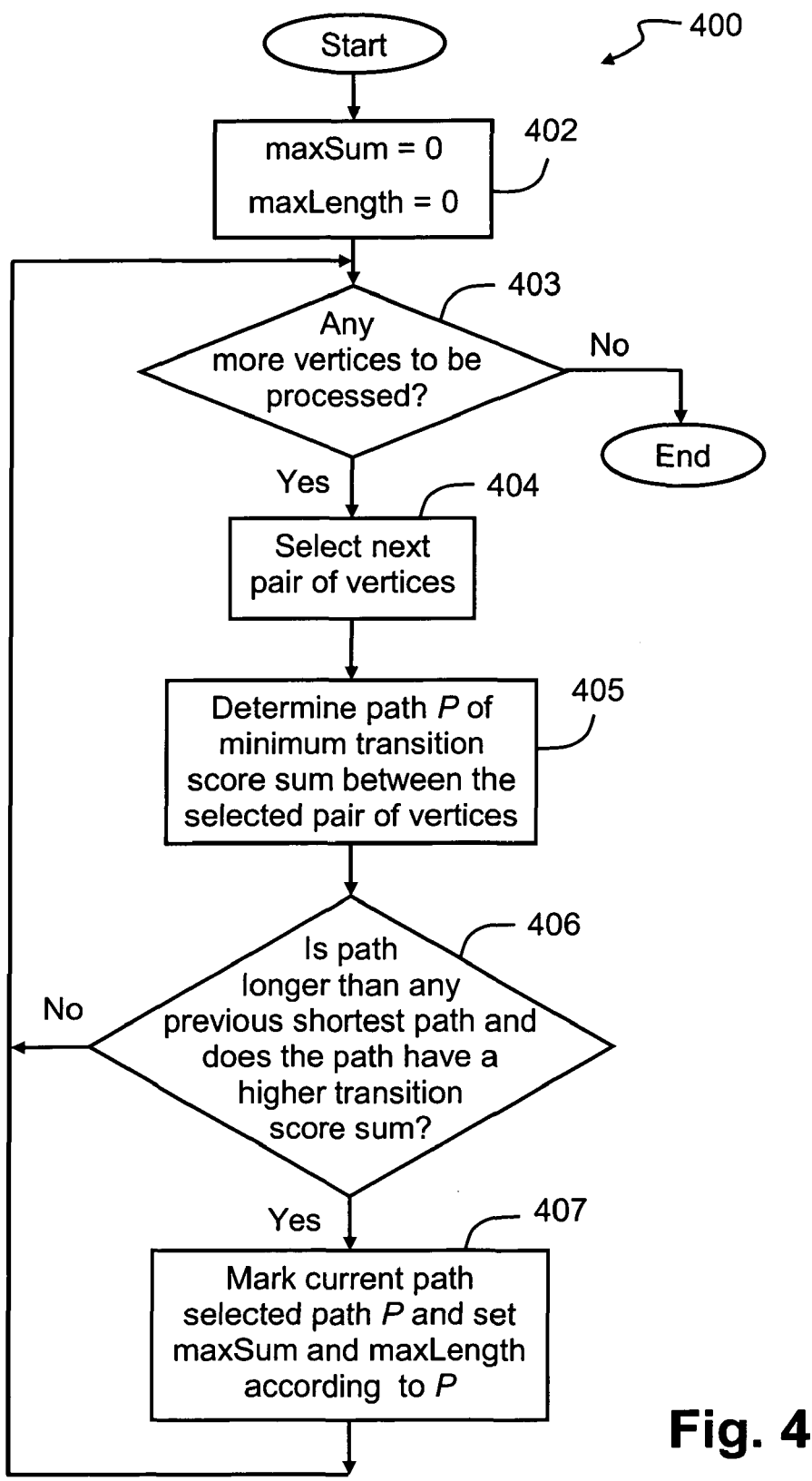
FIG. 4 is a flow diagram showing a method of selecting a path in a semantic transition graph, as executed in the method of FIG. 1.

FIG. 3 shows an example of a semantic transitions graph 300. Each vertex of the graph 300 represents a particular group of images (i.e. a set of images sharing a common selected annotation). Two vertices (e.g., Va and Vb) of the graph 300 are connected by a connecting (or directed) edge (e.g., 302) as soon as there is some degree of similarity between the annotations of the images assigned to the group represented by one of the two vertices (e.g., Va) and the annotations defining the group represented by the other of the two vertices (e.g., Vb). For example, the degree of relationship can be a minimum number of matching annotations. Further, one or more connecting edges from a first of the vertices (e.g., Va) to a second of the vertices (e.g., Vb) exists in the directed graph 300 if at least one image (or one item) of a group associated with the first vertex has annotations matching the selected annotation of a group associated with the second vertex.

When measuring the similarity of the annotations, specific weights may be attributed to the different categories. Each edge (e.g., 302) of the graph 300 is assigned a transition score that quantifies the above-mentioned degree of relationship with respect to the incident vertices of the edge. The transition score is associated with each connecting edge between a first and second vertex. Preferably, the transition score is equal to the number of matching annotations. That is, the transition score may be based on the number of images of a group associated with the first vertex having annotations matching annotations of a group associated with the second vertex. Alternatively, the transition score may be proportional or inversely proportional to the number of matching annotations.

A path in the directed graph 300 potentially provides a basis for navigating through a sequence of selected annotations with possible semantic transitions. Moreover, the higher the sum of the weights along constituent edges of the path, the smoother the transitions.

In the method 100, any pair of vertices ($V_1$, $V_2$) connected by an edge $e_{1(v1,v2)}$ is therefore also connected by an edge $e_{2(V2,V1)}$ with a similar score. Other definitions of the above-mentioned degree of relationship may lead to different connectivity properties.

The graph 300 is constructed based on four groups of images 307, 308, 309 and 310 and the following annotations:
 (i) {People=Jamie};
 (ii) {People=Paul};
 (iii) {Location=Montreal; Event=Conference}; and
 (iv) {Event=Birthday}.

Vertices Va, Vb, Vc and Vd respectively represent each of the four groups 307, 310, 309 and 308, respectively.

Images P1, P2 and P3 of the group 307 each contain one annotation that matches with the annotation {People=Jamie} and therefore are associated to vertex Va. Whenever such matching exists, the other images (i.e., P4 to P9) in the collection are associated to one or more vertices. For example, image P1 is associated to vertices Va and Vb, and images P4, P8, P9, and P5 are also associated to more than one vertex. As image P1 in the group 307 associated with vertex Va contains the annotation {People=Paul}, the image P1 provides a possible transition path to the images in the group 310 associated to the vertex Vb. In the example of FIG. 3, the transition scores are directly set to the number of matching annotations. Therefore an edge 302 with transition score one (1) is set from vertex Va to vertex Vb. As the image P1 is also in group 310 associated with the vertex Vb, an edge 304 also connects vertex Vb to vertex Va with the same transition score.

The groups 310 and 308 represented by vertices Vb and Vd, respectively, contain three (3) common images, and therefore connecting edges 311 and 312 both receive a transition score of three (3). The resulting graph 300 reveals two paths that allow browsing three (3) of the selected annotations with smooth semantic transitions. These two paths are: (Va, Vb, Vc) and (Va, Vb, Vd).

According to common classifications of Graph Theory problems, the selection of a path in the above-described semantic transition graph 300 is a typical "Route" problem. The path selection and the edge scoring may vary depending on the target length and transition smoothness. In particular, the length of a path is the number of edges. Further, the smoothness of a path is the sum of the transition scores associated with the edges of the path.

In one embodiment, the selected path is a longest path of paths between pairs of vertices of the graph 300. Determination of a longest path in a graph is an NP-complete problem in Graph Theory. Moreover, the graph of semantic transitions 300 potentially contains cycles.

One method of determining the longest path for the graph 300, for example, comprises the steps of repeating a single source shortest path algorithm for each pair of vertices (e.g., Va and Vb) and selecting a longest path of paths between pairs of vertices of the directed graph 300. Dijkstra's algorithm may be used for solving shortest path problems in O(x ln(x)) time.

In practice, more than one path may be the longest path. For example, two paths of the same length may be the longest paths in a particular graph, such as the graph 300. In this instance, any of the longest paths may arbitrarily be selected. However, such methods ignore the scores of the edges along the selected path. Therefore, two groups represented by a pair of incident vertices (e.g., Va and Vb) along the selected path (e.g., path 302) may have a relatively small number of matching annotations, which will limit the number of images that can be used for smoothly transiting from one vertex to the other vertex.

In order to maintain transition smoothness and in order to obtain a higher transition smoothness, the described methods balance high path length and total transition score. A method 400 of selecting a path in a semantic transition graph (e.g., the graph 300), will now described in further detail with reference to FIG. 4. The method 400 may be implemented as software resident on the hard disk drive 1110 and being controlled in its execution by the processor 1105.

In the method 400, each edge (e.g., 302) of the graph 300 is assigned a transition score equal to the number of matching annotations between the groups (e.g., 307) represented by the incident vertices of the edge.

The method 400 begins at step 402, where variables max-Sum and maxLength are set to zero (0). Then at the next step 403, if there are any unprocessed pairs of vertices in the graph 300, then the method 400 concludes. Otherwise, the method 400 proceeds to step 404.

At the next step 404, the processor 1105 selects a next pair of vertices (e.g., (Va, Vb) in the semantic transitions graph (e.g., the graph 300). In step 405, the processor 1105 determines a path P of minimum transition score sum between the vertex Va and the vertex Vb. The path P may be referred to as the "shortest path". Then, in step 406, if the processor 1105 determines that the path P is longer than any previous shortest path (i.e., Length (P)>maxLength) and has a higher transition score sum than any previous shortest path (i.e., edge_score_sum (P)>maxSum), then the method 400 proceeds to step 407. Otherwise, the method 400 returns to step 403. At step 407, the path P is marked as a current selected path (i.e., selected_path=P) and the transition score sum (i.e., maxSum=Length (P)) and length (i.e., maxLength=Length (P)) of the path P are stored in memory 1106, for example. Accordingly, the selected path P is a path of longest length and highest transition score sum amongst all paths of minimum total transition score between pairs of vertices of the directed graph 300.

The method 400 therefore determines the path of maximum length and the maximum transition score sum amongst all paths of minimum total transition score between pairs of vertices in the graph. In this case, a higher smoothness may be achieved by ignoring any edge having a corresponding score that is under a predetermined threshold (e.g., three (3)).

In another embodiment, the transition scores are inversely proportional to the number of transitions. In this instance, the selected path is the path of minimum transition score sum amongst all paths of minimum total transition score between pairs of vertices. In such an embodiment, preference is given to the transition smoothness before the length of the path itself.

As described above, a particular image may be assigned to more than one group of the sequence of selected groups. This may or may not be suitable to an application using the method 100. For example, if the method 100 is being used in an application for generating a photo slide show, it might not be desirable to prompt the same image twice in the course of the slide show, even when the image is relevant to several selected annotations. In this instance, it is possible to re-assign redundant images to only one group of the sequence, after the sequence of groups is determined.

Figure 5:
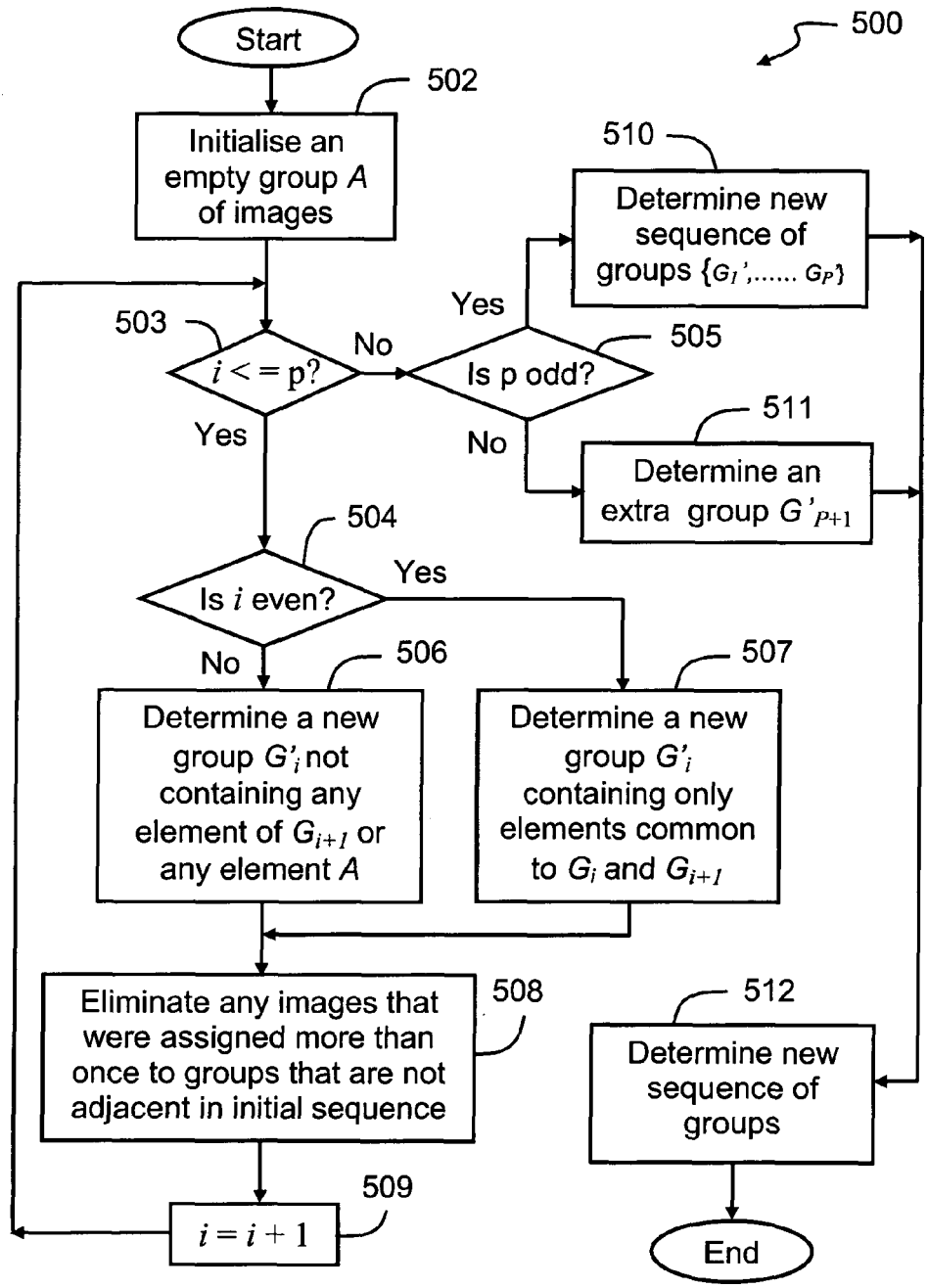
FIG. 5 is a flow diagram showing a method of re-assigning images.

A method 500 of re-assigning images will now be described with reference to FIG. 5. The method 500 may be implemented as software resident on the hard disk drive 1110 and being controlled in its execution by the processor 1105.

Denote $\{G_1, \ldots G_p\}$ an initial sequence of groups, in which some groups may have common images. In step 502, the processor 1105 initializes an empty group A of images already processed (i.e., A=0). Also at step 502, a variable i is set to one (1) (i.e., i=1). In the following steps 502 to 512, groups $G_i$ are considered pair-wise in sequence in order to create output groups $G'_i$. At the next step 503, if i≤p then the method 500 proceeds to step 504. Otherwise, the method 500 proceeds to step 505.

At step 504, if the processor 1105 determines that i is even, the method 500 proceeds to step 507. Otherwise, the method 500 proceeds to step 506, where the processor 1105 determines a new group $G'_i$ based on the group $G_i$ so that the group $G'_i$ does not contain any element of $G_{i+1}$, or any element of the group A. Such a condition may be formalized as follows:

$$G_i' = (G_i \backslash G_{i+1}) \backslash A,$$

where the notation $G_a \backslash G_b$ indicates the "relative complement" of $G_b$ in $G_a$, (i.e. $G_a \backslash G_b = \{x \in G_a | x \notin G_b\}$).

At step 507, the processor 1105 determines a new group $G'_i$ based on the group $G_i$ so that the group $G'_i$ contains only those elements common to the group $G_i$ and the group $G_{i+1}$, except for those already stored in the group A. A condition that may be formalized as follows:

$$G_i' = (G_i \cap G_{i+1}) \backslash A.$$

When either of steps 506 and 507 is completed, the method 500 proceeds to step 508 where the newly created group $G'_i$ is united to the group A, in order to eliminate any images from the group $G'_i$ that were assigned more than once to groups that are not adjacent in the initial sequence. Then at the next step 509, the variable i is incremented (i.e., i=i+1) and the method 500 returns to step 503.

At step 505, if p is even the method 500 proceeds to step 511. Otherwise, the method 500 proceeds to step 510 where a new sequence of groups $\{G'_1, \ldots G'_p\}$ is determined and the method 500 concludes.

At step 511, the processor 1105 determines an extra group $G'_{p+1}$ as follows:

$$G_{p+1}' = (G_{p-1} \cap G_p) \backslash A.$$

Then at the next step 512, a new sequence of groups $\{G'_1, \ldots G'_p\}$ is determined and the method 500 concludes. Alternatively, a new sequence of groups $\{G'_1, \ldots G'_p\}$ is determined at step 512.

Alternatively, rather than re-assigning images to groups in accordance with the method 500, the groups of images may be determined at step 104 so that no image is assigned to more than one group.

As described above, an annotation typically consists of a category-value pair, where the category can be any of {people, location, event, action, item, keyword, etc} and the value may be provided by a user. In some cases, the value provided for annotating an image is directly visible in the image, as for instance when indicating the name of a person photographed in the image. However, in other cases, the value may relate to invisible aspects, such as the name of a country, a holiday or any background information. An annotation may also relate to a small detail or to a key aspect of image content. Therefore, annotations are not always equally descriptive of the image to which the annotations refer.

As a consequence, the groups of images generated in step 104 contain images which are unlikely to be equally expressive of the annotations that the images have in common. For each pair of subsequent groups of images of the sequence of groups selected at step 106, the processor 1105 orders the images within each of the groups based on the following criteria (i) and (ii).

(i) The images within the group are decreasingly expressive of the annotation (i.e., one of the selected annotations) of the first of the subsequent groups of images; and (ii) The images within the group are increasingly expressive of the annotation (i.e., one of the selected annotations) of the second of the subsequent groups of images.

As will be described in detail below, a relevance score may be used in order to quantify how expressive an image is of one of the annotations of the image. The relevance score model will be described below.

The images within each of the selected groups may be ordered based on a relevance score associated with each of the images. The ordering of images within each selected group, as at step 106, will now be further described with reference to FIGS. 6 and 7.

Figure 6:
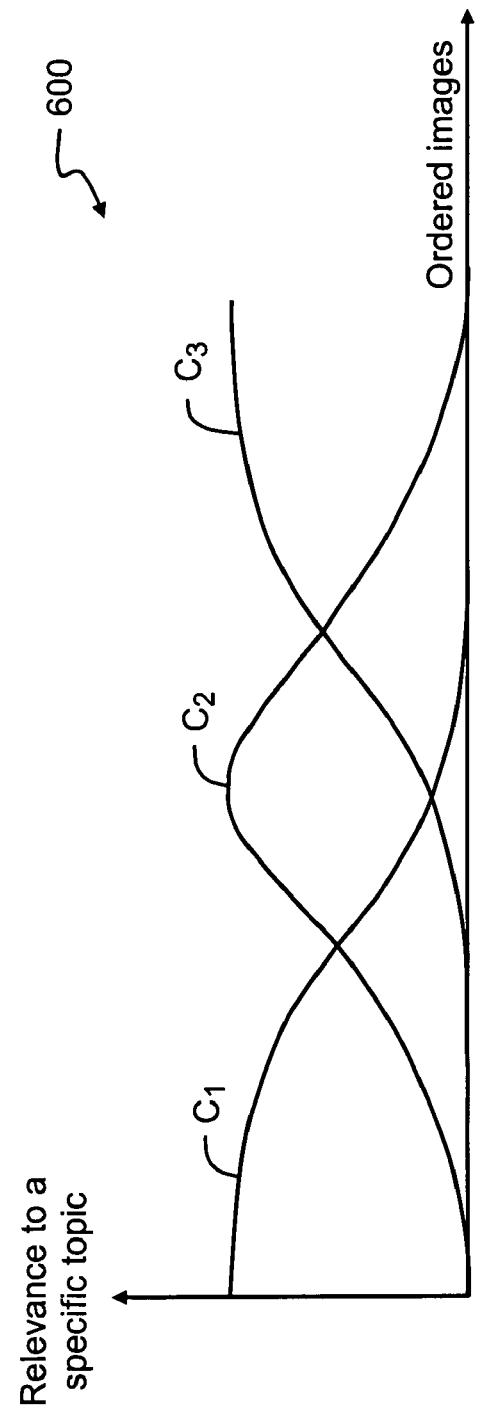
FIG. 6 is a graph showing relevance scores of each image in a sequence of images.

Consider three groups of images in the sequence of groups formed at step 105. In the present example, the three groups of images have respective annotations $t_1$, $t_2$, $t_3$. The ordered images represented by the three groups are aligned on the x axis of a graph 600 as seen in FIG. 6. The curves $c_1$, $c_2$ and $c_3$ of the graph 600 represent the relevance scores of each image in the sequence with respect to the annotations $t_1$, $t_2$, and $t_3$ respectively. When the images are presented, for example, on the display 1114, the first images presented are more expressive of the annotation $t_1$ than of the annotations $t_2$ and $t_3$. Then the relevance score of subsequently presented images with respect to annotation $t_1$ decreases while the relevance score relative to annotation $t_2$ simultaneously increases. Further along the x-axis of the graph 600, the relevance of subsequently presented images to annotation $t_2$ starts to drop while the relevance score relative to annotation $t_3$ increases.

In the sequence of groups $G'_i$ generated in accordance with the method 500 of re-assigning images groups $G'_i$ of the sequence having odd indices i contain images with annotations (only) matching the annotations of group $G_i$. Further, groups $G'_i$ of the sequence having pair indices i contain images with annotations matching the annotations of groups $G_i$ and group $G_{i+1}$.

Therefore, the images are ordered within each group of the sequence of groups, at step 106, depending on the parity of i.

Figure 7A:
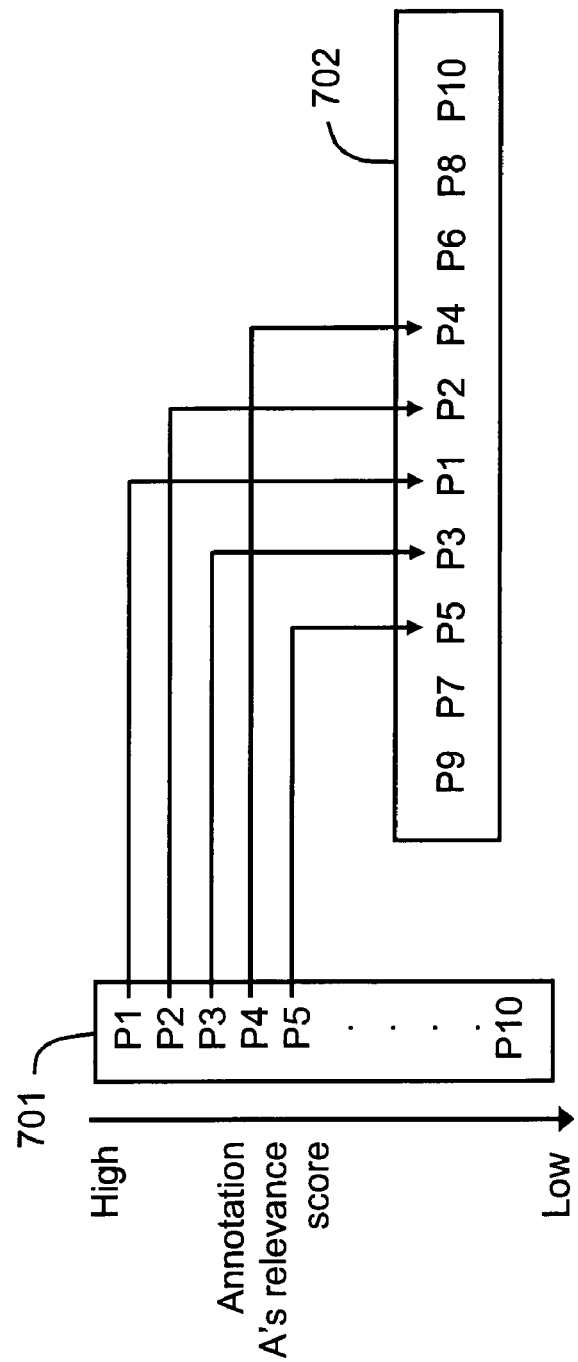
FIG. 7(a) shows a list of images before and after being ordered.
Figure 12:
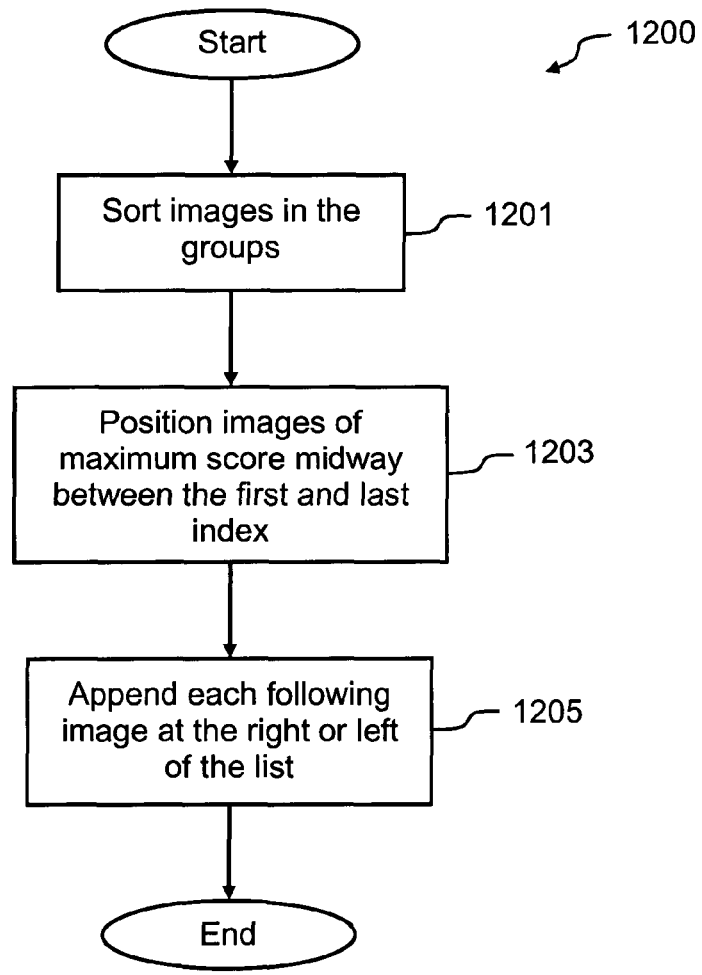
FIG. 12 is a flow diagram showing a method of ordering images.

A method 1200 of ordering images, as executed at step 106, will now be described by way of example with reference to in FIGS. 7(a) and 12. The method 1200 may be implemented as software resident on the hard disk drive 1110. In the example, the method 1200 is executed for a group $G'_i$ having an odd indice i and containing images $\{P_1, \ldots P_{10}\}$ where the images in the group $G'_i$ have annotations that only match the annotations of the group $G_i$.

The method 1200 begins at a first step 1201, where the images in the group $G'_i$ are sorted in decreasing order of their relevance score with respect to the annotations of group $G_i$, to determine a list of images 701. Then at the next step 1203, the image of maximum score $P_1$ in the list of images 701 is positioned midway between the first image $P_2$ and the last image $P_{10}$ of the new list of images 701. Then at the next step 1205, the processor 1105 determines a new list of images 702 by appending each following image $P_2, \ldots P_{10}$ in the list 702, in turn, at the right, or at the left of the list 701.

Figure 7B:
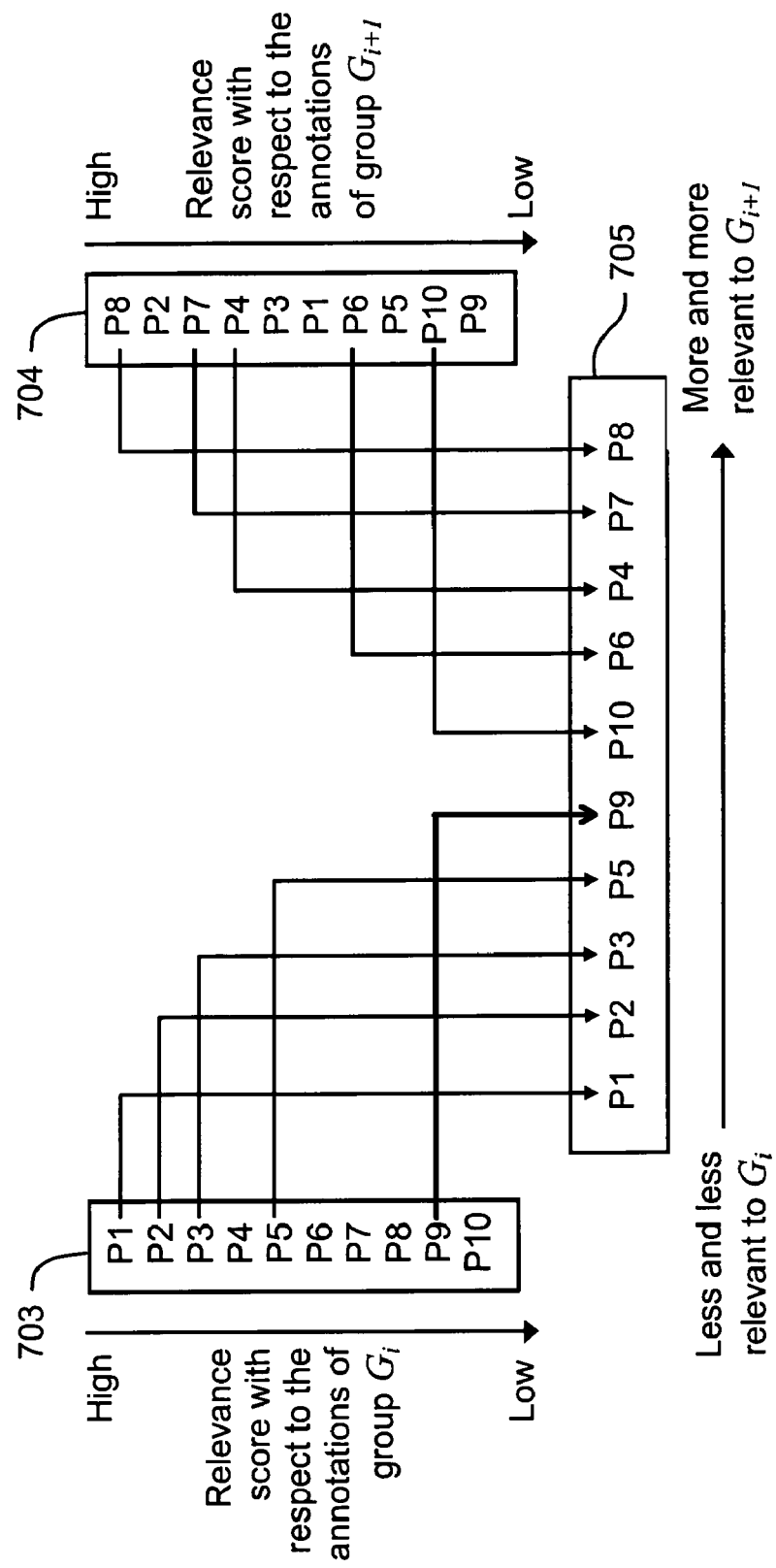
FIG. 7(b) shows two lists of images before and after being ordered.
Figure 13:
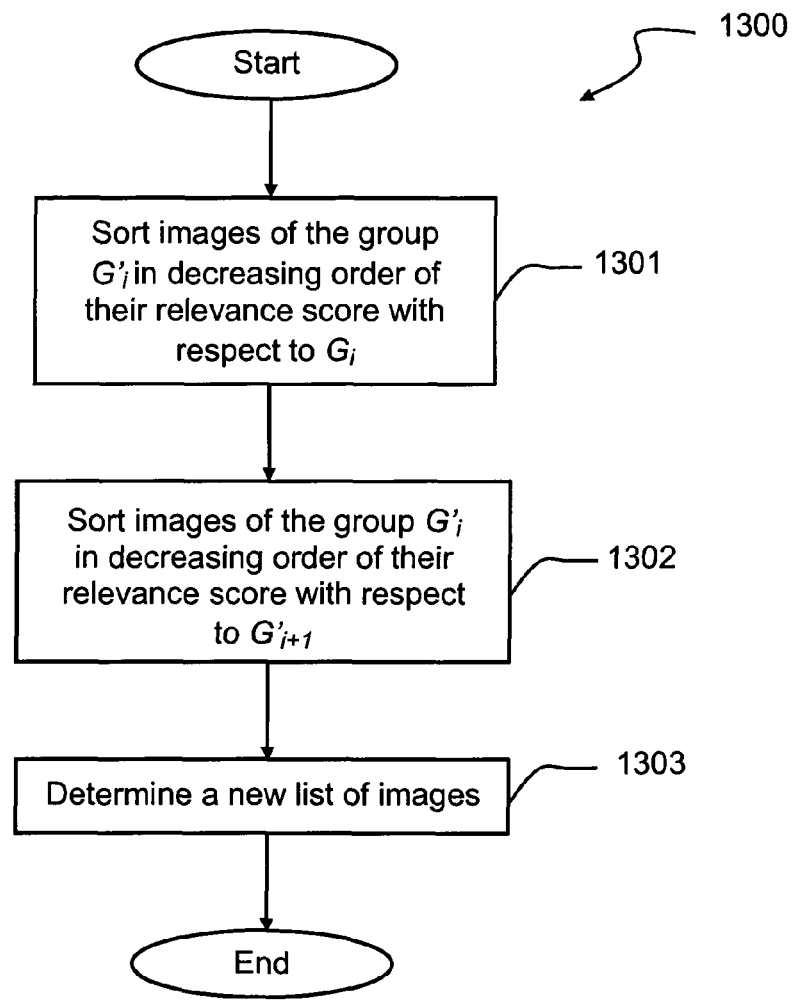
FIG. 13 is a flow diagram showing another method of ordering images.

Another method 1300 of ordering images, as executed at step 106, will now be described by way of example with reference to in FIGS. 7(b) and 13. The method 1300 may be implemented as software resident on the hard disk drive 1110. In the example, the method 1300 is executed for a group $G'_i$ containing images $\{P_1, \ldots, P_{10}\}$ where the images in the group $G'_i$ have annotations that match the annotations of two subsequent groups $G_i$ and $G_{i+1}$.

The method 1300 begins at a first step 1301, where the images of the group $G'_i$ are first sorted in decreasing order of their relevance score with respect to the annotations of the group $G_i$ to determine a list of images 703. At the next step 1302, the images of the group $G'_i$ are sorted in decreasing order of their relevance score with respect to the annotations of the group $G_{i+1}$ to determine a list of images 704. Then at the next step 1303, the method 1300 determines a new list of images 705, as seen in FIG. 7(b). The new list of images 705 is determined by appending the images $\{P_1, \ldots P_{10}\}$ of the groups $G_i$ and $G_{i+1}$ inwards from both extremes. To determine the new list of images 705 the images of highest rank in each list 703 and 704, which in the example of FIG. 7(a) are initially $P_1$ and $P_8$, are appended inward from the start and inward from the end of the list 705, respectively.

Whenever the same image simultaneously has the highest score with respect to both of the groups $G_i$ and $G_{i+1}$, as is the case with the image $P_2$ in the present example, the image is appended inward to the start of the list 705 if the relevance score relative to the group $G_i$ is greater than the relevance score of the image relative to the group $G_{i+1}$. Otherwise, the image is appended inward from the end of the list 705. In the present example, the images are positioned in the new list 705 as follows:

The image $P_1$ is appended inward from the start of the list 705, and the image $P_8$ is appended inward from the end of the list 705;

The image $P_2$ is appended inward from the start of the list 705 as the relevance score of the image $P_2$ indicates that the image $P_2$ is more relevant to the group $G_i$ than to the group $G_{i+1}$;

The image $P_3$ is appended inward from the start of the list 705 and the image $P_7$ is appended inward from the end of the list 705;

The image $P_4$ is appended inward from the end of the list 705 as the relevance score of the image $P_4$ indicates that the image $P_4$ is more relevant to the group $G_{i+1}$ than to the group $G_i$;

The image $P_5$ is appended inward from the start of the list 705 and the image $P_6$ is appended inward from the end of the list 705; and The image $P_9$ is appended inward from the start of the list 705 and the image $P_{10}$ is appended inward from the end of the list 705.

As described above, two images having a similar annotation may not necessarily be equally expressive of the semantics of this annotation. For instance, if one of the images has received many annotations and the second image has only received one annotation, the second image is more likely to be expressive of the unique common annotation than the first image. Thus, the number of annotations an image has received is preferably used as a relevance score parameter.

The relevance score is also preferably based on a precedence score that reflects other aspects of importance of a particular annotation with respect to the image that the annotation describes. For instance, a user profile may indicate categories of high interest for the user. The relevance score of annotations matching such categories may be weighted accordingly. In one embodiment, it is assumed that when being presented an image, a user is more likely to first annotate with what the user sees as the most important information. For this reason, the precedence score is also preferably based on an index of an annotation with respect to order of user input. This index may be an incremental value, set to one (1) for the first annotation given for a particular image. One or more of the precedence scores may be based on user preferences relative to annotation categories.

A number of known annotation methods use metadata propagation. In such methods, images are typically automatically grouped, for example, based on events. The user then typically annotates the groups of images. The annotations provided for a group of images are typically propagated across all images in the group. Further, one or more of the precedence scores described above may be weighted based on whether or not an annotation was gained through propagation.

Some known annotation methods also use summarization in order to prompt the user with a subset of the images in a group. In this instance, the user is not by default prompted with all the images of a group, which, at times, can lead to errors in the semantics of the annotations being propagated. Further, any relevance score value for an annotation that was gained through propagation can be assigned a lower weight.

Figure 8:
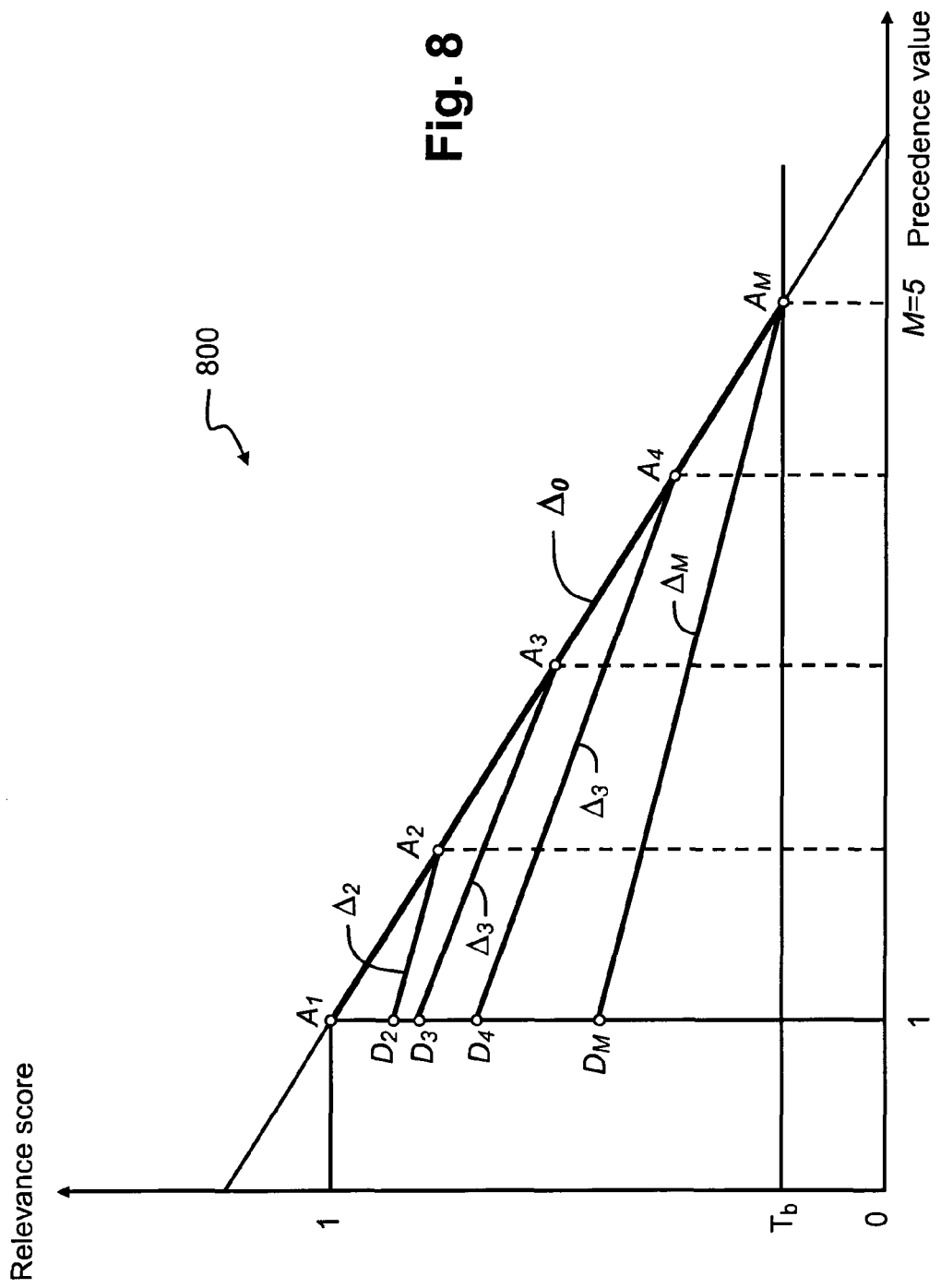
FIG. 8 is a graph showing a relevance score model.

The relevance score model will now be described with reference to FIG. 8, which shows a graph 800 of "Relevance score" (i.e., on the y-axis) versus "Precedence value" (i.e., on the x-axis).

Denote M, the maximum number of annotations that have been assigned to the images in the database configured within the hard disk drive 1110. In the present example, M equals five (5), which means that no image in the database has received more than five (5) annotations and at least one of the images has received exactly five (5) annotations. The preferred relevance score model relies on line $\Delta_0$, as seen in FIG. 8, defined by the following Cartesian Equation 1:

$$y = \frac{1}{M-1}((T_b - 1)x + M - T_b) \tag{1}$$

The line $\Delta_0$ represents the relevance score of an annotation of lowest precedence, as a function of the number of annotations the image described by the annotation received.

Typically, when the precedence score reflects the order of input, then a point $A_k$ on the line $\Delta_0$ indicates the relevance of the annotation last received for an image, given that the image has received a total of k annotations. For instance, point $A_1$ on the line $\Delta_0$ assigns the maximum relevance score to an annotation, if the annotation is the only annotation that the image has received. In the present example, the maximum relevance score set to one (1), as seen in FIG. 8.

Conversely, the minimum relevance score $T_b$ is attributed to an annotation that was last input by the user for an image that received M annotations (i.e. the most annotated image in the database). Threshold $T_b$ is set to be greater than zero (0), so that the relevance value zero can be reserved for scoring an annotation that does not match with any annotation an image has received. In one embodiment the threshold $T_b$ is set to 0.2.

A series of lines $\Delta_2, \Delta_3, \ldots \Delta_M$ each providing a relevance score model for a particular number k of received annotations is defined in accordance with Equation 2, as follows:

$$\forall k, 2 \leq k \leq M, \Delta_k : (D_k, A_k) \tag{2}$$

The coordinates of points $D_k$ for $k \geq 2$ are now defined. In the relevance score model described herein, the y coordinate value of point $D_2$ may be set in various ways, as long as the y coordinate value of point $D_2$ remains consistent with the y coordinate values of points $A_1$ and $A_2$. This consistency may be determined if the following constraints are verified:
 (i) The relevance score of the second annotation of an image that has received two annotations should be less than the relevance score of the first annotation for the same image; and
 (ii) The relevance score of the first annotation of an image that has received two annotations should be less than the relevance score of a unique annotation.

The above two constraints (i) and (ii) can be formalized in accordance with Equation (3), as follows:

$$y_{A_2} < y_{D_2} < y_{A_1} \qquad (3)$$

Preferably, the constraint defined by Equation (3) is met by setting the y coordinate value of point $D_2$ in accordance with Equation (4) as follows:

$$y_{D_2} = 1 - \frac{1}{2}(y_{A_1} - y_{A_2}) \qquad (4)$$

Similarly, the y coordinate value of a point $D_k$ where $k>2$ can be set in different ways, as long as the y coordinate value of the point $D_k$ remains consistent with the y coordinate values of points $A_{k-1}$ and $A_k$, which require at least the following constraint (i) to be verified:
 (i) The relevance score of the first annotation of an image that has received k annotations should be less than the relevance score of the first annotation of an image that has received k−1 annotations.

The above constraint (i) can be formalized in accordance with Equation (5) as follows:

$$y_{D_{k-1}} < y_{D_k} \qquad (5)$$

The constraint of Equation (5) does not specify how to set the y coordinates value of $D_k$ relative to that of $A_{k-1}$. Accordingly, the relevance score model may be configured to give a lower score to the first annotation of an image that has received k annotations than to the last annotation of an image that has received k−1 annotations. In this case, the relevance score model gives more influence to the number of received annotations. Alternatively, the relevance score model may be configured to give a higher score to an annotation of an image that has received k annotations than to the last annotation of an image that has received k−1 annotations when the precedence value of the image is under a certain proportion of the number of annotations. In this case, the relevance score model gives more influence to the precedence of the annotation being scored.

The constraint of Equation (5) may be met by setting the y coordinate value of point $D_k$ in accordance with Equation (6) as follows:

$$y_{D_k} - y_{A_{k-1}} = \frac{1}{2}(y_{D_{k-1}} - y_{A_{k-1}}) \qquad (6)$$

Equation (6) defines a mathematical progression, for which the k-th term can be expressed in accordance with Equation (7) as follows:

$$y_{D_k} \stackrel{k \geq 2}{=} \frac{1}{2^{k-2}} y_{D_2} + \sum_{j=1}^{k-2} \frac{1}{2^j} y_{A_{k-j}} \qquad (7)$$

The Cartesian equation of the line $\Delta_k$ defined by Equations (1), (2), (4) and (6) above, is shown below as Equation (8):

$$y = \frac{1}{1-k}\left(y_{D_k} - \frac{(T_b-1)k + M - T_b}{M-1}\right)x + \frac{1}{k-1}\left(k \cdot y_{D_k} - \frac{(T_b-1)k + M - T_b}{M-1}\right) \qquad (8)$$

The ordering of the images within each of the groups at step 106 only requires the y coordinates values of points on the lines $D_k$ for integer values of x to be determined. In one embodiment, the y coordinates values of points on lines $D_k$ for integer values of x may be predetermined and stored in an internal data structure configured within the hard disk drive 1110, for example.

FIG. 9(a) is a graph 901 showing a relevance score model for up to three (i.e., M=3) annotations (i.e., annotation 1, annotation 2 and annotation 3). As seen in FIG. 9(a), line 903 (i.e., "1 annotation") is the relevance score model for an image that has received one annotation. Line 905 (i.e., "2 annotations") is the relevance score model for an image that has received two annotations. Line 907 (i.e., "3 annotations") is the relevance score model for an image that has received three annotations.

FIG. 9(b) is a graph 902 showing a relevance score model for up to seven (i.e., M=7) annotations (i.e., annotation 1, annotation 2, annotation 3, annotation 4, annotation 5, annotation 6 and annotation 7). As seen in FIG. 9(b), line 909 (i.e., "1 annotation") is the relevance score model for an image that has received one annotation. Line 911 (i.e., "2 annotations") is the relevance score model for an image that has received two annotations. Line 912 (i.e., "3 annotations") is the relevance score model for an image that has received three annotations. Line 913 (i.e., "4 annotations") is the relevance score model for an image that has received four annotations. Line 915 (i.e., "5 annotations") is the relevance score model for an image that has received five annotations. Line 916 (i.e., "6 annotations") is the relevance score model for an image that has received six annotations. Line 917 (i.e., "7 annotations") is the relevance score model for an image that has received seven annotations.

The number of images within each of the second plurality of groups in the sequence formed at step 105 may or may not be suitable to a user or to specific user interface requirements. When necessary, some of the groups in the sequence may be filtered in order to better suit such constraints. Several examples of filtering methods that may be used to filter the groups of the sequence are provided below.

In one embodiment, the method 100 comprises an additional step of filtering the groups of the sequence formed at step 105 to form a sequence of images for each group that are "most representative" of the particular group. The term most representative as used herein in relation to images refers to a summary of a group of images that conveys the characteristics that are common to the images in the group. The actual number of representative images for a particular group of images can be predetermined based on a number of clusters (or sub-groups) that can be extracted from the group of images when further dividing the group into clusters of high-similarity images, based on some feature similarity metrics such as, for instance, colour histogram intersections.

Figure 14:
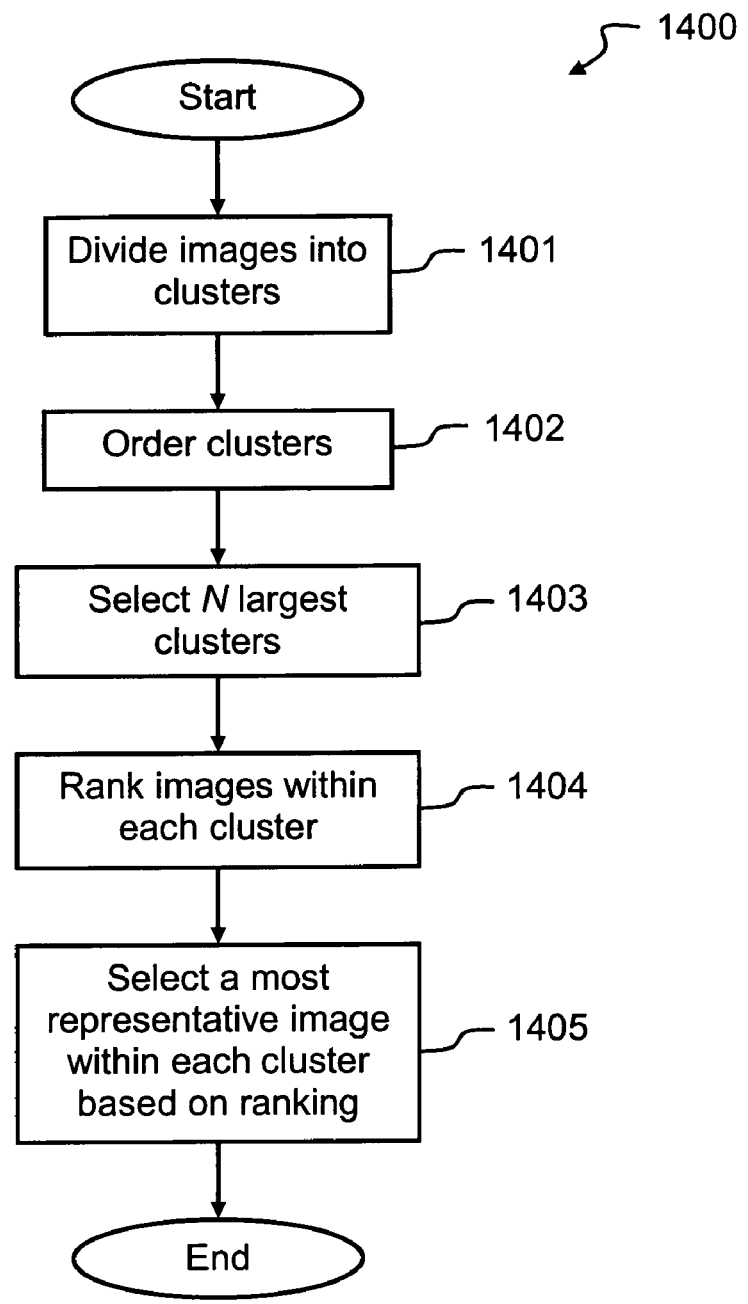
FIG. 14 is a flow diagram showing a method of determining a most representative image for a group of images.

A method 1400 of determining a most representative image for each cluster will now be described with reference to FIG. 14. The method 1400 may be implemented as software resident on the hard disk drive 1110 and being controlled in its execution by the processor 1105.

The method 1400 begins at the first step 1401, where the images of a particular group are divided into clusters of high-similarity images, based on a predetermined feature similarity metric as described above. The method 1400 continues at the next step 1402, where the clusters of images determined at step 1401 are ordered according to their size. Then at the next step 1403, the N largest clusters are selected, where N represents the maximum number of most representative images as required, for example, by the user of the above methods.

The method 1400 continues at the next step 1404, where the images within each cluster are ranked according to the number of features each of the images share with other images of the same cluster. The images within each cluster may also be ranked according to the quality of the images and a measure of the level of user interest in each particular image. Such features may include, for instance, capture settings, detected textures or objects, annotations, etc. The method 1400 concludes at the next step 1405, where the ranking of the images within each cluster are used to select a most representative image for each cluster.

In another embodiment, the groups of images in the sequence of groups formed at step 105 are filtered by removing any image from the sequence of groups, which has one or more annotations that are different from the selected annotations of the adjacent groups, with respect to a particular category. This filtering allows for the composition of a transition between two annotations related to the category People, for example, without presenting images that also relate to a third person.

In still another embodiment, the processor 1105 may perform the step of eliminating any image in the sequence of groups formed at step 105 that has a particular unwanted annotation. The ordered images within each of the selected groups in the sequence may be filtered by only keeping a number of most representative images.

In still another embodiment, the processor 1105 may perform the step of eliminating a number of images from the sequence of groups based on the influence of the eliminated images on a resulting relevance distribution. For example, the processor 1105 may perform the step eliminating an arbitrary number of images from the sequence of groups, each of the eliminated images having relevance scores most departing from a reference Gaussian distribution, based on the relevance score distribution described above with reference to FIG. 6.

The filtering of the groups of the sequence formed at step 105 may also involve content-based image analysis (e.g. intensity, colour, and/or hue and saturation), for example, in order to remove repetitive (or very similar) images or in order to remove images of poor quality (e.g. low sharpness, insufficient contrast, etc) from the sequence of groups. The filtering of the groups of the sequence formed at step 105 may also involve content-based image analysis for removing images from the sequence of groups in order to maximize the diversity of the overall sequence or in order to generate a sequence that additionally goes through gradual changes of the images visual content.

Preferably, each group of the sequence of groups formed at step 105 is filtered in order to remove enough images from the sequence of groups to match a predetermined number $N_u$ of images. For example, an image in the image sequence of a group may be deleted every P images, wherein P is determined in accordance with Equation (9) below:

$$P = \frac{\text{Group size}}{\text{Group size} - N_u}.$$

This value of P may also be determined based on a temporal duration provided by the user.

The methods described above may be implemented as a software application that prompts the user with a choice of automatically generated presentations. In this instance, an analysis of the annotation database may be performed in order to select a number of filters to be applied to each group of the sequence of groups formed at step 104. For example, in one embodiment a statistic of relating to categories and values of an annotation may be determined and annotations of maximum variance may then be selected.

Alternately, user preference records may be compiled in order to select filters to be applied to each group of the sequence of groups formed at step 104. For example, if it appears that the user is most interested by images presenting people, it might be worth determining a People-based transition graph and evaluating whether the paths the graph contains meet a target smoothness or length.

The graphical user interface (GUI) 1000 will now be described by way of example with reference to FIG. 10. The GUI 1000 displays the ordered sequence of images generated in accordance with the method 100 along with at least one of the selected annotations. In the example of FIG. 10, the ordered sequence of images is presented on the display 1114 in the form of a slide-show upon user request or at regular time intervals. For example, one image the GUI 1000 of FIG. 10 shows an image 1002 displayed. A corresponding list of selected annotations {i.e., Annotation 1, Annotation 2, Annotation 3, . . . , Annotation 7} 1003 is displayed on the left hand side of the GUI 1000.

Visual effects may be applied to the selected annotations in order to indicate the relationships between the displayed images and the selected annotations. For example, a visual effect may be used to simulate a beam of light (e.g., the beam of light 1004) that highlights the annotations (i.e., Annotation 2 and Annotation 3) relevant to the image 1002 being displayed. As a result, the light beam 1004 sequentially progresses along the list of selected annotations 1003 as each image is displayed in the GUI 1000.

When the currently displayed image (e.g., 1002) is relevant to several annotations in the list of annotations 1003, the beam 1004 enlarges to cover the corresponding annotations, as shown in FIG. 10. Conversely, the light beam 1004 may only focus on a single annotation (e.g., Annotation 2). Alternately, other visual effects may be used to express the relationship between the images (e.g., 1002) and the selected annotations (e.g., Annotation 2 and Annotation 3). For example, the visual effects include fade-ins and fade-outs or shrinks and stretches, to be applied to the annotations or to the images. The relevance score of an annotation with respect to a particular image may be used as a parameter for such visual effects. That is, appearance parameters of the visual effects may be based on a relevance score model such as that described above.

Equivalently, a "storytelling progress bar" may be used to indicate which of the selected annotations 1003 are relevant to the image (e.g., 1002) being displayed. In the instance, the selected annotations 1003 are aligned along such a storytelling bar.

In still another embodiment, an alternative embodiment may only partially display parts of the list of selected annotations 1003, thereby giving more or less contextual information on upcoming or past images.

INDUSTRIAL APPLICABILITY

It is apparent from the above that the arrangements described are applicable to the computer and data processing industries).

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of generating an ordered sequence of items from a collection of items, at least one of the items of the collection being associated with a plurality of annotations, the method comprising the steps of:
    selecting a first annotation for a first group of items and a second annotation for a second group of items;
    receiving the first group of items from the collection of items, each item in the first group being associated with the first annotation;
    receiving the second group of items to form a sequence of groups, each item in the second group being associated with the second annotation, and the second group being adjacent to the first group and comprising an item associated with the first annotation; and
    ordering the items in the first group and the second group, respectively, and appending the first group to the second group such that
        the item in the second group that is associated with the first annotation is between the items in the first group and the remaining items in the second group, and
        the items in the second group are increasingly associated with the first annotation and decreasingly associated with the second annotation.

2. A method according to claim 1, wherein at least one of the following criteria is satisfied:
    (A) the annotations each have an associated frequency score that is higher than a predetermined threshold,
    (B) a predetermined number of annotations having highest frequency scores are selected,
    (C) the annotations each match one or more predetermined category-specific conditions,
    (D) the annotations are selected based on a priority value assigned to each annotation category, and
    (E) the annotations are selected using a relevance score associated with each of the annotations.

3. A method according to claim 1, wherein at least one of the following criteria is satisfied:
    (A) an item of the collection is assigned to the first group if any of the annotations of the item matches the first annotation, and
    (B) an item of the collection is assigned to the first group if any of the annotations of the item is similar to the first annotation.

4. A method according to claim 1, wherein each of the items belongs to only one of the groups.

5. A method according to claim 1, wherein the items in each of the groups are ordered based on a relevance score associated with each of the items.

6. A method according to claim 1, further comprising the step of removing a predetermined number of items from the sequence of groups.

7. A method according to claim 1, further comprising at least one of the following steps:
    (A) removing an item from the sequence of groups which has one or more annotations different from the annotations selected for adjacent groups;
    (B) removing an item from the sequence of groups which has one or more annotations different from the annotations selected for adjacent groups with respect to a particular category;
    (C) eliminating an item from the sequence of groups which has a particular unwanted annotation;
    (D) eliminating a number of items from the sequence of groups based on the influence of the eliminated items on a resulting relevance distribution;
    (E) eliminating an arbitrary number of items from the sequence of groups, each of the items having a relevance score most departing from a reference Gaussian distribution;
    (F) removing repetitive items from the sequence of groups;
    (G) eliminating poor-quality items from the sequence of groups; and
    (H) removing the items from the sequence of groups such that maximize diversity of the sequence is achieved.

8. A method according to claim 1, wherein the ordered items in each of the groups are filtered by keeping a number of most representative items.

9. A method according to claim 1, wherein a graphical user interface (GUI) displays the sequence along with at least one of the selected annotations.

10. A method according to claim 1, wherein the receiving of the second group to form said sequence of groups is based on a selection of a path in a directed graph of semantic transitions.

11. An apparatus for generating an ordered sequence of items from a collection of items, at least one of the items of the collection being associated with a plurality of annotations, the apparatus comprising:
    a memory; and
    at least a processor functioning as:
    selection mean for selecting a first annotation for a first group of items and a second annotation for a second group of items;
    first receiving means for receiving the first group of items from the collection of items, each item in the first group being associated with the first annotation;
    second receiving means for receiving the second group of items to form a sequence of groups, each item in the second group being associated with the second annotation, and the second group being adjacent to the first group and comprising an item associated with the first annotation; and
    ordering means for ordering the items in the first group and the second group, respectively, and appending the first group to the second group such that
        the item in the second group that is associated with the first annotation is adjacent to the first group of items, and the items in the second group are increasingly associated with the first annotation and decreasingly associated with the second annotation.

12. A non-transitory computer-readable medium, having a program recorded thereon and configured to make a computer execute a method to generate an ordered sequence of items from a collection of items, at least one of the items of the collection being associated with a plurality of annotations, the method comprising the steps of:

selecting a first annotation for a first group of items and a second annotation for a second group of items;

receiving the first group of items from the collection of items, each item in the first group being associated with the first annotation;

receiving the second group of items to form a sequence of groups, each item in the second group being associated with the second annotation, and the second group being adjacent to the first group and comprising an item associated with the first annotation; and ordering the items in the first group and the second group, respectively, and appending the first group to the second group such that the item in the second group that is associated with the first annotation is adjacent to the first group of items, and the items in the second group are increasingly associated with the first annotation and decreasingly associated with the second annotation.

* * * * *